(12) United States Patent

Graczyk et al.

(10) Patent No.: US 10,199,715 B2
(45) Date of Patent: Feb. 5, 2019

(54) SYSTEMS AND METHODS FOR LOCATING RACK-BASED ASSETS

(71) Applicant: RF CODE, INC., Austin, TX (US)

(72) Inventors: Ronald B. Graczyk, Cedar Park, TX (US); Edmund G. Healy, Austin, TX (US); Ryan D. Joy, Austin, TX (US); Jesse L. Richardson, Austin, TX (US); Michael R. Primm, Austin, TX (US)

(73) Assignee: RF Code, Inc., Austin, TX (US)

( * ) Notice: Subject to any disclaimer, the term of this patent is extended or adjusted under 35 U.S.C. 154(b) by 6 days.

(21) Appl. No.: 15/412,571

(22) Filed: Jan. 23, 2017

(65) Prior Publication Data

US 2017/0214117 A1    Jul. 27, 2017

Related U.S. Application Data

(60) Provisional application No. 62/281,325, filed on Jan. 21, 2016.

(51) Int. Cl.
*H01Q 1/24* (2006.01)
*H01Q 1/22* (2006.01)
(Continued)

(52) U.S. Cl.
CPC ............ *H01Q 1/2225* (2013.01); *G01S 5/02* (2013.01); *G01S 13/74* (2013.01); *G01S 13/767* (2013.01);
(Continued)

(58) Field of Classification Search
CPC ........... H01Q 7/005; H01Q 1/24; H01Q 1/245
(Continued)

(56) References Cited

U.S. PATENT DOCUMENTS 8,558,694 B2 * 10/2013 Brandt ................. H04W 4/043
340/539.13
8,674,822 B2 * 3/2014 Priyantha ............ G06Q 10/087
340/505
(Continued)

FOREIGN PATENT DOCUMENTS

WO    2007140800 A1    12/2007

OTHER PUBLICATIONS

International Search Report and Written Opinion dated May 12, 2017 for corresponding PCT/US2017/014530, 17 pages.

*Primary Examiner* — Huedung Mancuso
(74) *Attorney, Agent, or Firm* — Larson Newman, LLP; John Schell

(57) ABSTRACT

A system includes a central server; a reader in communication with the central server; and a set of equipment racks. Each equipment rack of the set of equipment racks defines a face. The each equipment rack includes an observer device and at least two antenna arrays. At least one of the at least two antennas is in communication with the observer device. The system further including a set of tags attached to assets disposed within the set of equipment racks. Each tag of the set of tags is to transmit a beacon signal including a tag identifier of the each tag. The at least one antenna is to receive the beacon signal. The observer device is to communicate the tag identifier and the characteristics of the beacon signal to the reader and central server. The central server determines a rack location based on the characteristics of the beacon signal.

21 Claims, 6 Drawing Sheets

(51) Int. Cl.
  *G06K 7/10* (2006.01)
  *H01Q 3/26* (2006.01)
  *H01Q 9/04* (2006.01)
  *H01Q 21/00* (2006.01)
  *G01S 5/02* (2010.01)
  *G01S 13/74* (2006.01)
  *G01S 13/76* (2006.01)
  *G01S 13/87* (2006.01)
  *G06Q 10/08* (2012.01)

(52) U.S. Cl.
  CPC ........ *G01S 13/878* (2013.01); *G06K 7/10366* (2013.01); *G06Q 10/087* (2013.01); *H01Q 3/26* (2013.01); *H01Q 9/0407* (2013.01); *H01Q 9/0421* (2013.01); *H01Q 21/00* (2013.01)

(58) Field of Classification Search
  USPC .......................................................... 343/702
  See application file for complete search history.

(56) References Cited

U.S. PATENT DOCUMENTS

| | | | |
|---|---|---|---|
| 9,337,555 B2* | 5/2016 | Pierce | H04Q 1/026 |
| 9,456,522 B2* | 9/2016 | Aimone | G06Q 10/087 |
| 9,519,813 B2* | 12/2016 | Grover | G06K 19/07798 |
| 2009/0189767 A1 | 7/2009 | Primm et al. | |
| 2009/0295645 A1 | 12/2009 | Campero et al. | |
| 2011/0298607 A1 | 12/2011 | Priyantha et al. | |
| 2014/0292582 A1 | 10/2014 | Ware | |
| 2015/0235067 A1 | 8/2015 | Kilian | |

* cited by examiner

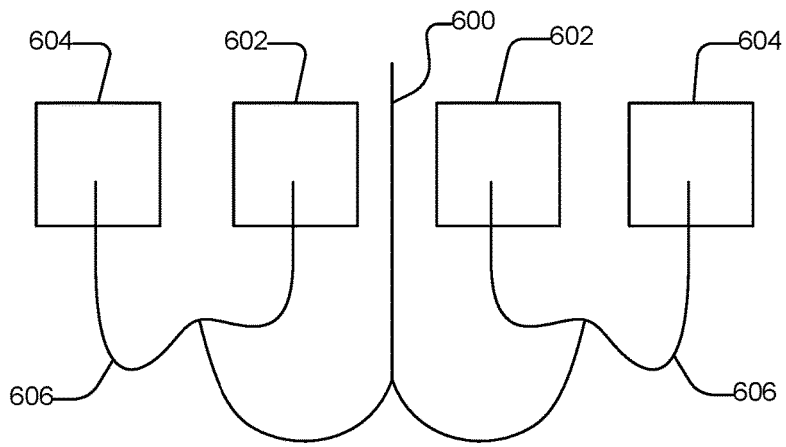
FIG. 6
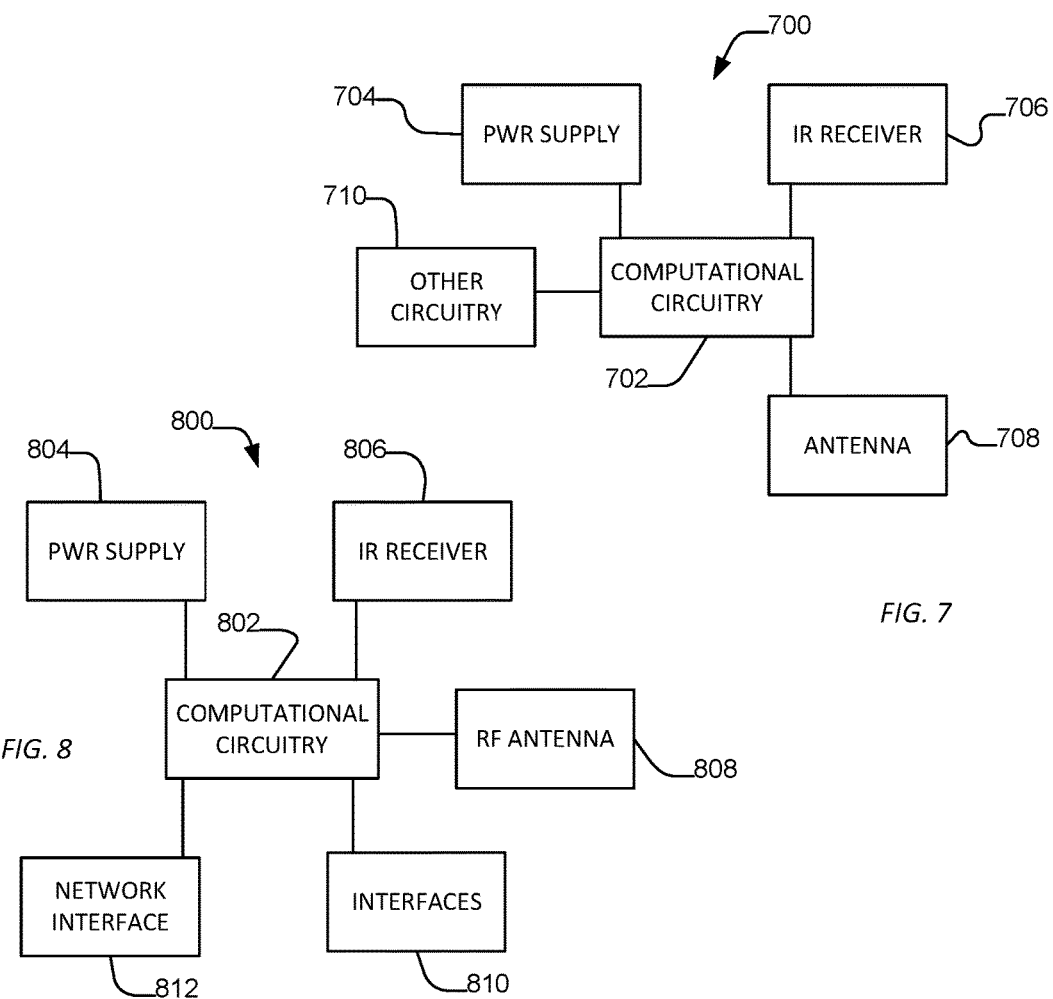
FIG. 7
FIG. 8

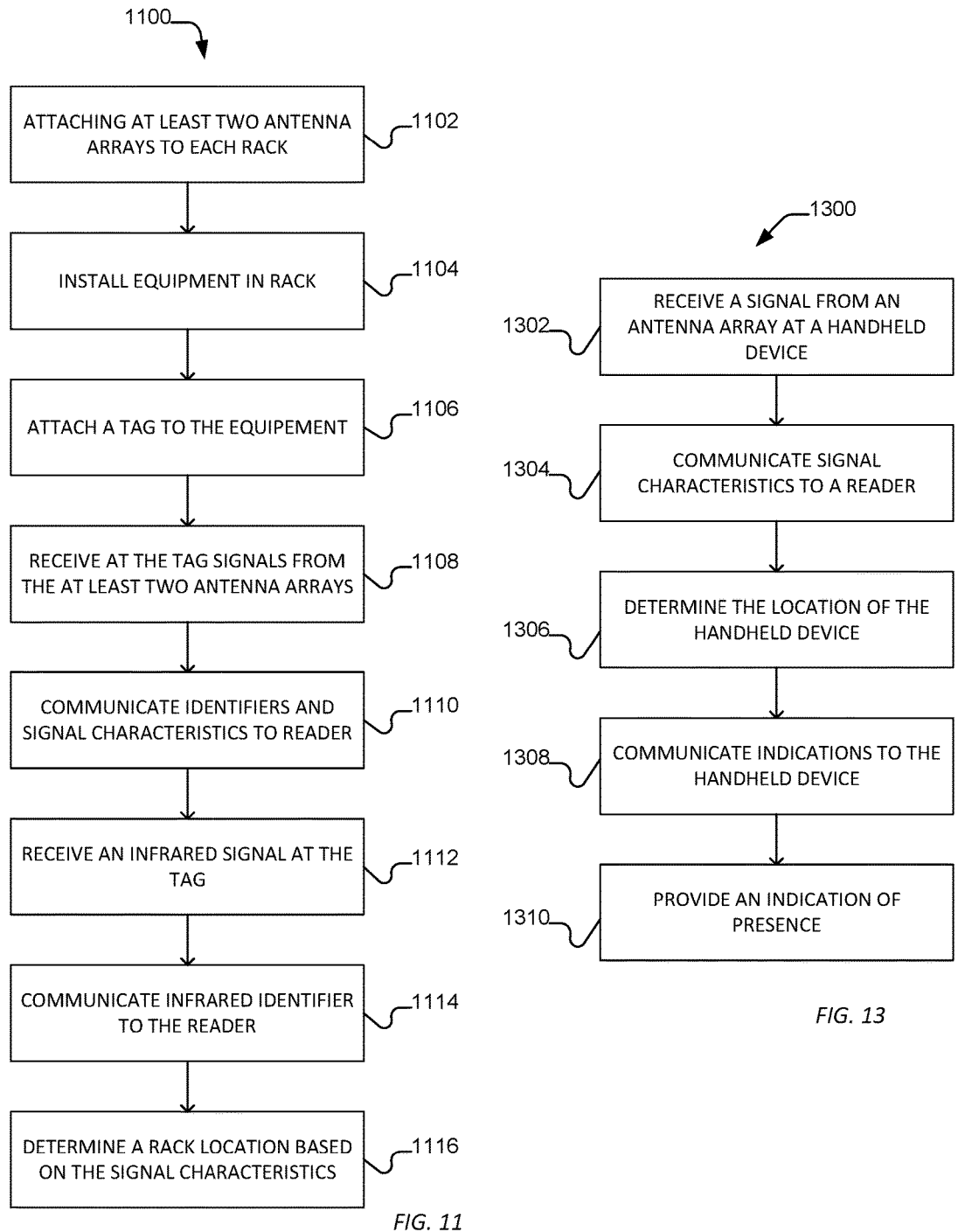

US 10,199,715 B2

SYSTEMS AND METHODS FOR LOCATING RACK-BASED ASSETS

CROSS-REFERENCE TO RELATED APPLICATION(S)

This application claims benefit of U.S. Provisional Application No. 62/281,325, filed Jan. 21, 2016, which is incorporated herein by reference in its entirety.

FIELD OF THE DISCLOSURE

This disclosure, in general, relates to systems and methods for locating rack-based equipment.

BACKGROUND

With the ever-increasing digital economy, there is increasing demand for servers and networking equipment. Typically, servers and network equipment are housed in racks. Often servers and network equipment are maintained in large facilities including a large number of racks housing similar equipment.

Periodically, servers and network equipment become damaged or need maintenance. However, the physical location of servers or network equipment does not necessarily correspond with network address of the server or network equipment. As such, in facilities housing a large number of servers and associated network equipment, locating a particular server or network device is difficult. In addition, tracking servers and network devices that are removed from racks for maintenance or storage can be difficult.

As such, improved systems and methods for tracking the rack location of servers and network equipment would be desirable.

BRIEF DESCRIPTION OF THE DRAWINGS

The present disclosure may be better understood, and its numerous features and advantages made apparent to those skilled in the art by referencing the accompanying drawings.

FIG. 4, FIG. 5, and FIG. 6 include illustrations of exemplary antenna arrays.

FIG. 7 includes an illustration of exemplary circuitry for a tag device.

FIG. 8 includes an illustration of exemplary circuitry for a handheld device.

FIG. 9, FIG. 10, and FIG. 11 illustrate exemplary methods for tracking rack-based assets.

FIG. 13 and FIG. 14 include illustrations of exemplary methods for tracking rack-based assets.

The use of the same reference symbols in different drawings indicates similar or identical items.

DETAILED DESCRIPTION

Figure 1:
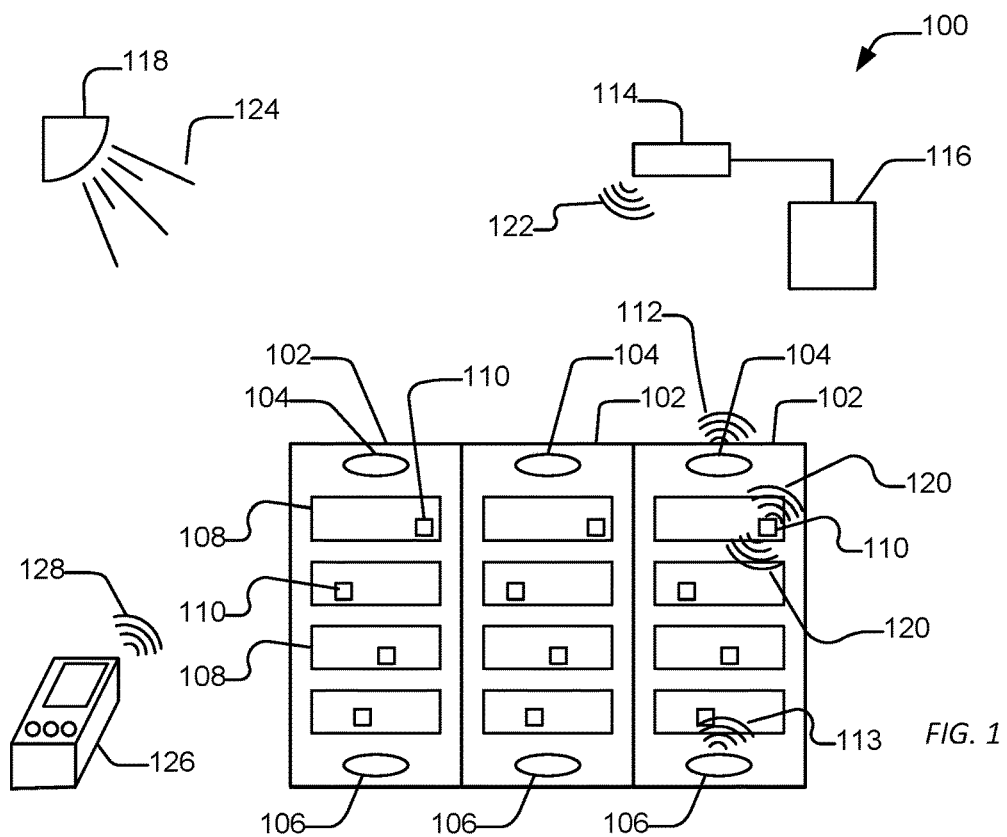
FIG. 1 includes an illustration of an exemplary asset tracking system for rack based equipment.

In an exemplary embodiment, the tracking system includes a reader, a set of racks, and a set of tags. Each rack of the set of racks includes a rack-based observer device associated with one or more antenna arrays. The one or more antenna arrays are configured to observe advertising or beacon signals from a tag of the set of tags associated with equipment disposed within the rack. In particular, the one or more antennas are arranged to receive advertising or beacon signals from different directions along a face of a rack. The rack-based observer device can communicate characteristics of the tag beacon or advertising signal to a central server, for example, through a wireless network to the reader in communication with the central server or through a wired network to the central server. In a further example, the reader can provide instructions to the tags.

In another example, the rack-based observer device can broadcast advertising or beacon signals to be received by the tag and the tag can communicate aspects of the advertising signals to the reader. In a further example, the rack-based observer device can establish a communication link with the tag and provide the tag with identifiers and signal characteristics that can be communicated by the tag to the reader. For example, the tag can communicate with the reader, providing the data or characteristics of the signals received from the one or more antenna arrays.

In the above examples, a central server can determine the location of the tag and its associated asset based on the data and characteristics of the signals received from the tags or from the antenna arrays of the rack-based observer devices. In a particular example, a rack-based observer device of the one or more rack-based observer devices disposed within a rack can act as a reader that communicates data, such as data received from tags, to the central server. Optionally, the system can include an infrared observer device. The tag can receive infrared signals from the infrared observer device and can provide identifiers, data, or characteristics of the infrared beacon signal to the reader or to the rack-based observer device.

Optionally, the system can include a handheld device operable to communicate with the rack-based observer devices, the reader, and optionally, the infrared beacon. When the handheld device is near a rack, the handheld device can provide advertising or beacon signals to the rack-based observer devices, which can communicate the data and characteristics of the signal to the central server through the reader or through a wired network, where the central server can determine a location of the handheld device (i.e., to which rack the handheld device is in proximity). The central server, through the reader, can communicate the location to the handheld device or provide instructions or commands to handheld device to provide indication that the device is proximal to a desired rack.

In an exemplary method for tracking the rack-based assets, the rack-based observer device can receive one or more advertising or beacon signals from one or more tags, each associated with a rack-based asset, and can communicate data or characteristics of the signals to the reader. The reader can communicate the data and signal characteristics to a central server, where determination is made regarding the rack location of a rack-based asset.

In an exemplary embodiment illustrated in FIG. 1, a system 100 includes a set of racks 102. Each rack 102 can store or warehouse rack-based equipment 108. Each rack 102 includes one or more rack-based observer devices and associated antenna arrays (e.g., 104 or 106). Each rack 102 defines a plurality of faces. For example, the racks generally include vertically oriented faces, such as a front face, a back face, and side faces. In addition, the racks include horizontally oriented faces, such as a top face and a bottom face. The rack 102 can further be configured with positions or slots, for example, distributed vertically for servers or network equipment. Generally, the equipment 108 disposed within a rack 102 is accessible through a front face or through a back face of the rack. Often, the racks 102 are disposed side-by-side to form a row of racks. Additional rows of racks can be disposed in front of or behind the illustrated row racks, forming aisles through which the server equipment can be accessed.

Each rack 102 can include rack-based observer devices having one or more antenna arrays (e.g., 104 or 106). The one or more antenna arrays can be disposed on opposite edges of a rack and proximal to a face of the rack 102, such as a front face or a back face. As illustrated, an antenna array 104 is disposed proximal to the top edge of the rack 102, and an antenna array 106 is deposed closer to a bottom edge of the rack 102, both proximal to a front face of the rack 102.

The system 100 can further include a reader 114 connected to a central server 116. Tags 110 attached to the rack-based assets or equipment 108 can transmit advertising or beacon signals 120 that can be detected by the antenna arrays (e.g. 104 or 106) attached to a rack-based observer device. The rack-based observer devices can communicate with the reader 114 using a signal, such as a signal 112 or 113. In an example, the antenna arrays are each attached to different rack based observer devices that each communicate with the reader, either through a wireless connection or a wired connection. In another example, a single rack-based observer device can be coupled to two or more antenna arrays 104 or 106 and communicate aspects of the tag beacon or advertising signals received at each antenna array 104 or 106 to the reader through a wireless connection or through a wired network to a central controller 116.

In an alternative example, the antenna arrays 104 or 106 can transmit advertising or beacon signals, including an identification of the antenna array. The tag 110 can detect the advertising or beacon signals, and the tag 110 can 120 to communicate identifiers, data, or signal characteristics associated with the beacon signals received from the rack-based antenna arrays 104 or 106 to the reader 114. The reader 114 can provide the identifiers, data, or signal characteristics received from the tags 110 to the central server 116, where a determination as to the rack location of the tag 110 and associated rack-based asset or equipment 108 can be made. In another example, the rack-based observer devices attached to the rack-based antenna arrays 104 or 106 can serve as readers, networking with the tags 110, and can be in communication with the central server 116, such as a through a wired or wireless network interface, to communicate aspects of the beacon signals observed by the tags 110 or other data from the tags 110.

In an example in which the rack-based antenna arrays provide advertising or beacon signals, the rack-based antenna arrays 104 or 106 can communicate signals having similar frequencies and configurations. But, the signals can transmit different data or can transmit at different power levels. In particular, the signals can each include different identifiers, such as different addresses (e.g., MAC addresses), that can be used to identify in which rack and at what location within the rack the antenna array is located. For example, the central sever can have a database of identifiers associated with rack locations.

When the tags 110 provide a beacon signal to the rack-based antenna arrays 104 or 106, the tag beacon signals can include identifiers that can be used to identify the tag 110, and the rack-based observer can provide both the identity of the tag and the identity of the antenna arrays that detected the tag beacon signal along with characteristics of the tag beacon signal, such as signal strength, received at the antenna array.

The tags 110 or the antenna arrays 104 or 106 can communicate, such as transmitting an advertising or beacon signal, using a frequency in a range of between 2.0 GHz and 2.5 GHz, such as between 2.25 GHz and 2.5 GHz, or between 2.4 GHz and 2.485 GHz. Further, the tags 110 or the antenna arrays 104 or 106 can be configured to emit signals having a power in a range of 0.01 W to 1.1 W, such as a range of 0.05 W to 0.7 W or a range of 0.1 W to 0.5 W.

In particular, the advertising or beacon signals from the tags 110, or alternatively from the antenna arrays 104 or 106, can implement a multichannel communication protocol, such as a spread spectrum communication protocol. In particularly, the advertising or beacon signal can be broadcast over 2 to 5 channels, such as 3 channels. In a particular example, the communication protocol can permit bi-directional communication. In an example, the rack-based observer devices can use an antenna array to establish a wireless network, such as a master-slave wireless network. Optionally, the tag can participate as a slave in the master-slave wireless network. Alternatively, the tag can be a beacon only device.

The reader 114 can communicate with the tag 110 or the rack-based observer device using a signal 122. For example, the reader 114 can provide commands and instructions to the tags 110. In an example, the central server 116 can instruct, through the reader 114, a specific tag to signal its presence, such as through the use of lighting or sound. In another example, the reader can communicate with a rack-based observer device. In particular, the signal 122 can have a frequency in a range of 100 MHz to 1 GHz, such as 300 MHz to 1 GHZ or 350 MHz to 600 MHz, for example, 433 MHz. In an alternative example, the signal 122 can have a frequency in a range of between 2.0 GHz and 2.5 GHz, such as between 2.25 GHz and 2.5 GHz, or between 2.4 GHz and 2.485 GHz. The signals can include tag identifiers, commands, or data payloads, among other information. In a particular example in which the antenna arrays receive beacon signals from the tags and an associated observer device communicates aspects of the beacon signals to the reader, the signals 112 or 113 can transmit messages that include a tag identifier, characteristics of the beacon signal, such as a signal strength, timing information, or a combination thereof and optionally, antenna or observer device identifiers. In an alternative example in which the tag is to detect an advertising or beacon signal from one or more antenna arrays, the tag can communicate with the reader with a message including a tag identifier, data associated with the signals received from the rack-based antenna arrays, such as signal strength, array identifiers, other beacon identifiers, timing data, or a combination thereof. In either example, the signal 122 can transmit messages that include a tag identifier, tag commands, timing information, or a combination thereof.

Optionally, the system 100 includes an infrared beacon device 118, providing an infrared beacon signal 124 that can be received by the tags 110. The infrared beacon signal 124 can include an identifier indicative of location that can be received by the tags 110 and communicated as part of the beacon signal to the observer devices, or in a signal to the reader 114. Such location information can further be stored by the central server 116 or used in determining a location of the tag.

In a further example, the system 100 can also include a handheld device 126. In an example, the handheld device 126 can transmit advertising or beacon signals that can be received by the antenna arrays and aspects of the handheld device beacon signal can be communicated to the reader 114 or central server 116 by the rack-based observer device. Alternatively, when the antenna arrays broadcast advertising or beacon signals, the handheld device 126 can receive beacon signals 112 or 113 from the rack-based antenna arrays 104 or 106 and can communicate identifiers, data, or characteristics of the signals 112 or 113 to the reader 114 using signal 128. The reader 114 can communicate the data and signal characteristics to the central server 116, which can determine a proximity of the reader 126 to a selected rack. Alternatively, the handheld device can form a network with the rack-based observer device. In either case, the central server 116, through the reader 114, can communicate with the handheld device 126, providing instructions to signal when the handheld device is proximal to the desired rack 102. Optionally, the handheld device 126 further includes an infrared receiver to receive the infrared beacon signal 124. Identifiers or data from the infrared beacon signal 124 received at the handheld device 126 can be further communicated to the reader 114 and to the central server 116. In an example, the handheld device 126 can communicate with the reader 114 and the central server 116 to assist in finding a desired rack 102 and desired tag. Once the handheld device 126 is proximal to the desired rack 102, the handheld device 126 can provide a request to the central server 116 through the reader 114 to command a tag 110 to indicate its presence through sound or a light indicator. The signal 128 can be similar to the communication signals 122, or can include data or identifiers similar to that of the tags 110 or may include additional commands, requests, or information.

Figure 2:
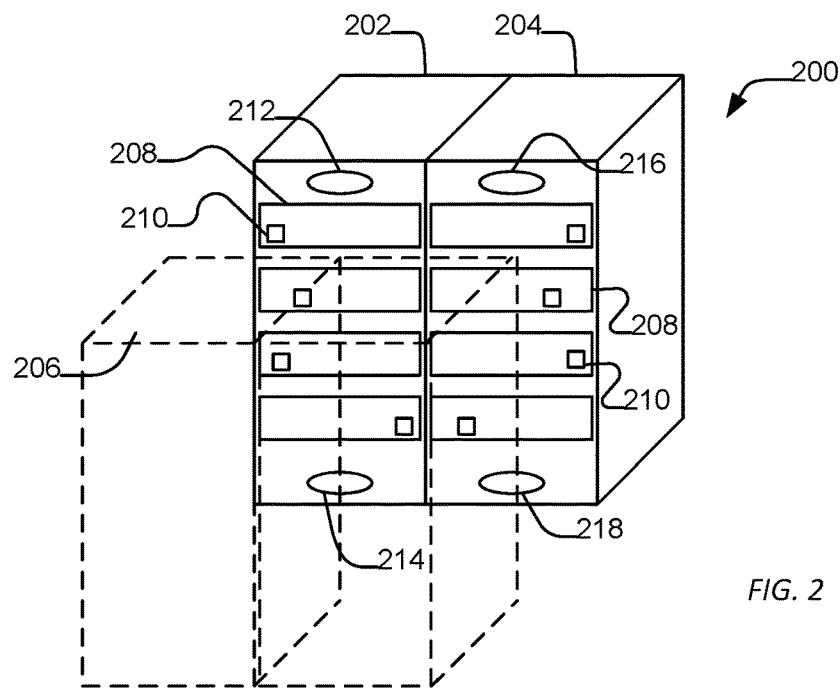
FIG. 2 includes an illustration of an exemplary set of racks.

As illustrated in FIG. 2, a set of racks 200 can be distributed to form rows. For example, racks 202 or 204 can be positioned adjacent to each other within a row. Additional racks can be positioned in rows spaced apart from the racks 202 or 204 to form an aisle. For example, a rack 206 can be disposed in a row spaced apart from the racks 202 or 204, forming an aisle between the rack 206 and the racks 202 or 204. In a particular example, a front face of the racks 202 and 204 can face a front face of the rack 206 across the aisle. Such an arrangement allows access to the front faces of the racks, but also leads to difficulties in using conventional rack-based beacon systems because signals can bleed across aisles or between adjacent racks.

As illustrated, the rack-based equipment 208 is disposed within the racks 202 or 204. Tags 210 are associated with each rack-based asset 208. One or more observer devices can be disposed within a rack and proximal to a face of the rack. For example, an antenna array 212 is disposed near a top edge and proximal to the front face of the rack 202, and the antenna array 214 is disposed near the bottom edge and proximal to the front face of the rack 202. Similarly, an antenna array 216 can be disposed proximal to the top edge and proximal to a front face of the rack 204, and an antenna array 218 can be disposed along a bottom edge of the front face of the rack 204. In a particular example, the antenna arrays (212, 214, 216, or 218) receive signals from a particular direction along the face, limiting the strength of the signal received from outside of the plane extending along the front face of the rack. As such, a tag 210 disposed on equipment 208 disposed in the rack 202 likely communicates a stronger signal to the antenna arrays 212 or 214 than to adjacent racks, for example, including antenna arrays 216 or 218, or racks across an aisle. Utilizing algorithms, heuristics, or statistical methods, a location of the equipment 208 attached to the tag 210 can be determined with a relative degree of certainty. In alternative embodiments, such antenna arrays can be configured to transmit signals along the face of the rack, with limited signal strength further from the face of the rack.

Figure 12:
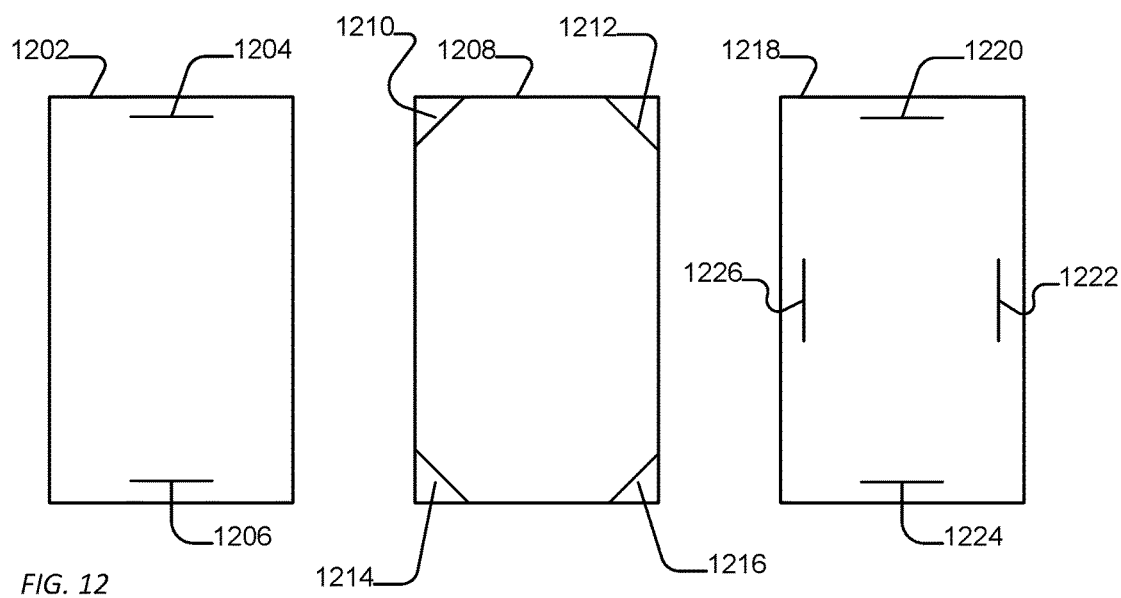
FIG. 12 includes an illustration of exemplary antenna configurations.

While the antenna arrays illustrated in FIG. 2 are illustrated as being disposed along the top edge and the bottom edge proximal to the front face of the rack, such antenna arrays can alternatively be disposed at other locations or proximal to other faces of the rack. For example, as illustrated in FIG. 12, a rack 1202 can include a first antenna array 1204 disposed proximal to the top edge of the front face and a second antenna array 1206 disposed proximal to the bottom edge of the face. Alternatively, the face can be a back face or side face. In a further example illustrated in FIG. 12, a rack 1208 can include a plurality of antennas, such as three or four antenna arrays. When broadcasting, each antenna array can provide a different identifier within its associated signal. Alternatively, pairs of antenna arrays can provide the same identifier or a combination of a similar identifier and a different identifier in their signals. In an example, two antenna arrays 1210 and 1212 can be disposed proximal to a top edge of a face of the rack 1208 and antenna arrays 1214 and 1216 can be disposed proximal to a bottom edge proximal to a front face of the rack 1208. As illustrated, the antenna arrays can extend at angles in positions proximal to the corners of the face. In a further exemplary embodiment, the rack 1218 includes a plurality of antenna arrays 1220, 1222, 1224, and 1226. The antenna arrays can be disposed along orthogonal faces of the rack 1218 and are directed across a face, such as a front face. In a particular example, an antenna array 1220 is disposed proximal to the top edge of the front face, an antenna array 1222 can be disposed proximal to the right edge of the face, an antenna array 1224 can be disposed along the bottom edge of the face, and antenna array 1226 can be disposed along the left edge of the front surface.

Figure 3:
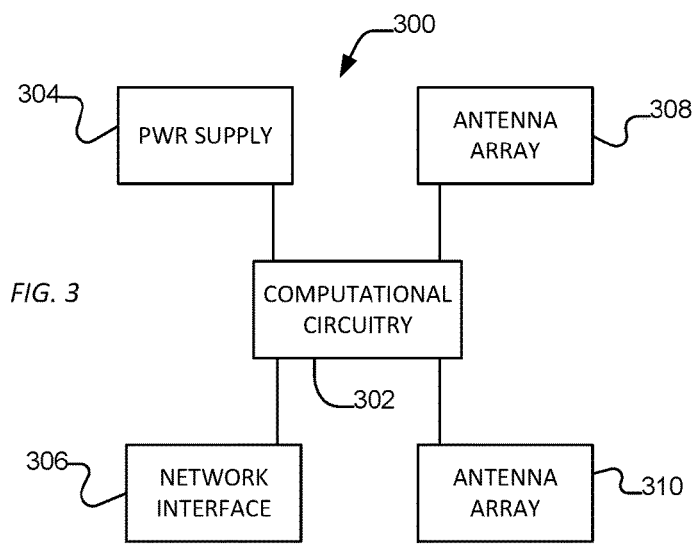
FIG. 3 includes an illustration of exemplary circuitry associated with a rack-based observer device.

FIG. 3 includes an illustration of an exemplary circuitry 300 of a rack-based observer device. For example, the rack-based observer device circuitry 300 can include computational circuitry 302, which can include a processor and memory for implementing program instructions. The computational circuitry 302 can be coupled to a power storage 304, such as a battery or line power supply. In addition, the computational circuitry 302 can be coupled to one or more antenna arrays, such as antenna arrays 308 and 310. In an example, the computational circuitry 302 can receive advertising or beacon signals from the antenna array 308. In an example, the antenna array 308 can be disposed along a top edge of the front surface of a rack. Optionally, the computational circuitry 302 can be in communication with a second antenna array 310, receiving advertising or beacon signals. In an example, the second antenna array 310 can be disposed along a bottom edge of the front face of a rack.

Optionally, the computational circuitry 302 is connected to a network interface 306 to interact with a network. For example, the network interface can be a wireless interface, a wired interface, or a combination thereof. The computational circuitry 302 through the network interface 306 can communicate with the reader or the central server of the tracking system. In particular, the network interface 306 can be used to interact with a central server of the tracking system. In an example, the network interface 306 can be an Ethernet interface, universal serial bus (USB), 802.11x compliant wireless interface, a proprietary wireless interface, such as a wireless interface to communicate with a reader, or a combination thereof. The computational circuitry can transmit identifiers and signal characteristics associated with received advertising or beacon signals, in addition to the identity of the antenna array or rack-based observer device to the central server for use in determining the location of equipment assets or handheld devices. Alternatively, an observer device can include a single antenna array for indicating location and more than one rack-based observer devices can be used in any given rack.

In an alternative example, the computational circuitry 302 can direct the antenna array 308 to provide a signal carrying an identifier indicative of location, for example, identifying a rack in which the antenna array 308 or observer device is located. The identifier can be specific to the rack or can be a unique identifier that can be associated to a rack by a central server. In a particular example, the computational circuitry 302 directs the antenna array 308 to provide an advertising or beacon signal carrying data or identifiers useful in identifying the location of the antenna array 308. Optionally, the computational circuitry 302 can direct an antenna array 310 to provide a separate signal, such as an advertisement signal or a beacon signal further identifying the second antenna array 310. Such advertising or beacon signals transmitted by the antenna arrays 308 or 310 can be detected by tags that transmit identifiers and signal characteristics to readers.

Each of the antenna arrays can include one or more antennas. In particular, the antenna array can include between 2 and 10 antennas, such as between 2 and 6 antennas. In an example, the antenna array includes an even number of antennas, such as 2 or 4 antennas. In another example, the antenna array includes an odd number of antennas, such as 3 or 5 antennas. Alternatively, a single antenna can be using in place of the antenna array. For example, the single antenna can be a directional antenna.

Figure 4:
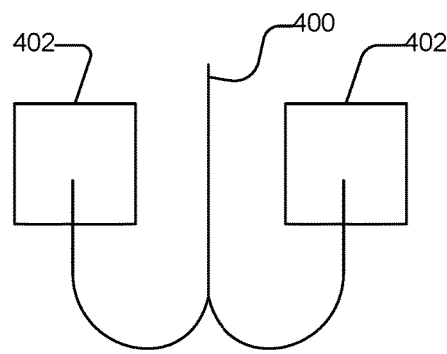
Figure 5:
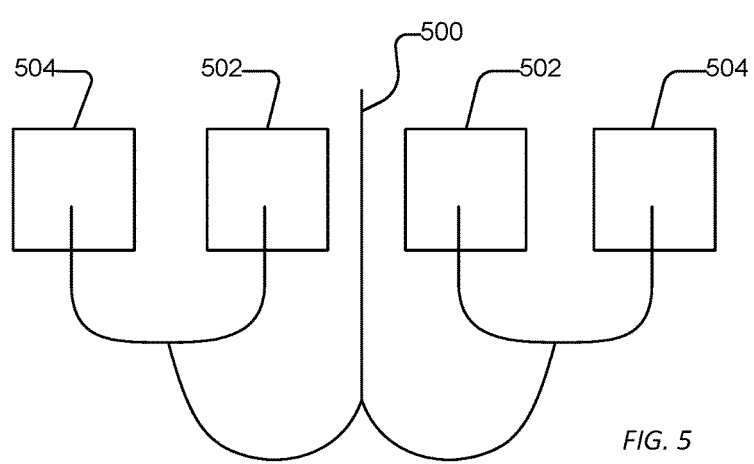

For example, FIG. 4 illustrates exemplary antenna array 400 that includes two antennas 402. Each antenna is electrically coupled to provide the same signal. In another example illustrated in FIG. 5, an antenna array 500 can include a plurality of antennas, such as four antennas. Each of the antennas (502 or 504) can be electrically connected to provide the same signal. For example, interior antennas 502 are distributed closer to a middle of the array, whereas edge antennas 504 are disposed proximal to edge of the array. In a further example illustrated in FIG. 6, an antenna array 600 includes a plurality of antennas, such as at least four antennas. In an example, interior antennas 604 can be configured to emit the same signal, while edge antennas 604 disposed at an edge of the array can be connected to the rest of the array by a meandering line 606, resulting in a signal out of phase with the interior antennas 602. While FIG. 4, FIG. 5, and FIG. 6 are illustrated as arrays with a single row of antennas, the antenna arrays can include more than one row or be 2-dimensional arrays.

In a particular example, the antennas can be patch antennas. In another example, the antennas can be shorted patch antenna. In a further example, the antennas can be inverted-F antennas, such as tightly meandering inverted F or slotted inverted F antennas. In a particular example, the antennas are tightly meandering inverted F antennas. The antenna arrays can include lensing on a side not in the direction of the tags. For example, the antenna arrays can include a dielectric, such as a shaped dielectric formed on a side of the array opposite a side facing the rack equipment. As such, the signals transmitted by the array can be directed and shaped to extend along the face of a rack proximal to the expected location of the tags.

The antennas can be configured to receive or emit signals, depending on the configuration of the system, at a frequency in a range between 2.0 MHz and 2.5 MHz, such as between 2.25 MHz and 2.5 MHz, or between 2.4 MHz and 2.485 MHz. Further, the antennas can be configured to receive or emit signals having a power in a range of 0.01 W to 1.1 W, such as a range of 0.05 W to 0.7 W or a range of 0.1 W to 0.5 W. In a particular example, the signals can be spread spectrum signals and can permit bi-directional communication. In an example, the rack-based observer devices can use an antenna array receive beacon signals from tags or can be used to establish a wireless network, such as a master-slave wireless network. Optionally, the tag can participate as a slave in the master-slave wireless network.

A tag is attached to the rack based equipment and can include antennas to transmit beacon signals and can optionally include other radio frequency (RF) antennas to communicate with the reader. For example, as illustrated in FIG. 7, a circuitry 700 of a tag can include computational circuitry 702, which can include processors and memory to store and implement program instructions. In additional, the computational circuitry 702 can be coupled to a power supply 704, such as a battery or line power supply, to supply power to the computational circuitry 702 and other circuitry. In addition, the computational circuitry 702 can be coupled to one or more antennas 708. For example, the computational circuitry 702 can direct an antenna 708 to broadcast an advertising or beacon signal. Alternatively, the computational circuitry 702 can receive advertising or beacon signals from the rack-based antenna arrays through the antenna 708. Further, the computational circuitry 702 can direct the antenna 708 to communicate with a reader. In a particular example, the antenna 708 can be a multi-frequency antenna or a collection of different antennas. The antenna 708 can be a directional antenna or alternatively can include an array of antennas.

Optionally, the tag circuitry 700 can include an infrared receiver 706 in communication with the computational circuitry 702. For example, the infrared receiver 706 can receive infrared signals from an infrared observer device that includes an identifier indicative of location. The infrared circuitry 706 can receive the infrared signal carrying the identifier, and the computational circuitry 702 can communicate the identifier through the antenna 708 to the reader or incorporate data in a beacon-like signal.

In a further example, the computational circuitry 702 can be attached to other circuitry 710, such as lights, speakers, or vibration mechanisms. Such circuitry can be activated in response to commands from a handheld device or central server to indicate is presence.

Optionally, the system can include a handheld device to guide a user to the desired rack and provide instruction to a particular tag. For example, as illustrated in FIG. 8, a circuitry of a handheld device can include computational circuitry 802, which can include processors and memory to store and implement program instructions. The computational circuitry 802 can be coupled to the power supply 804, such as a battery or line power supply, to provide power to the computational circuitry 802 and other circuitry. In an example, the computational circuitry 802 can be coupled to an antenna 808 to broadcast beacon signals to the rack-based antenna arrays. In an alternative example, the computational circuitry 802 can receive identifiers or signal characteristics from the rack-based antenna arrays and can communicate such identifier or signal characteristics to the reader using the antenna 808. The reader can communicate with a central server, which determines a location of the handheld circuitry and provides an indication through the reader to the handheld device to signal when the handheld device is located proximal to the desired rack. The antenna 808 can be a multi-frequency antenna or a collection of antennas for different frequencies.

The computational circuitry 802 can further be coupled to an infrared receiver 806. In an example, the infrared receiver 806 can receive an infrared signal from an infrared beacon that includes an identifier that can be used to determine location. The computational circuitry 802 can provide the identifier to the reader through the antenna 808.

The handheld device 800 can further include user interfaces 810. Exemplary user interfaces can include displays, such as touchscreen displays, buttons, switches, pointer devices, lights, vibration mechanisms, or sound devices. The computational circuitry 802 can interact with the user interface 810 to provide user interface functionality to the handheld device 800. In addition, the computational circuitry 802 can be coupled to a data interface 812, such as a USB interface or network interface. Such an interface 812 can allow for data transfer or programming or configuring the handheld device 800.

Figure 9:
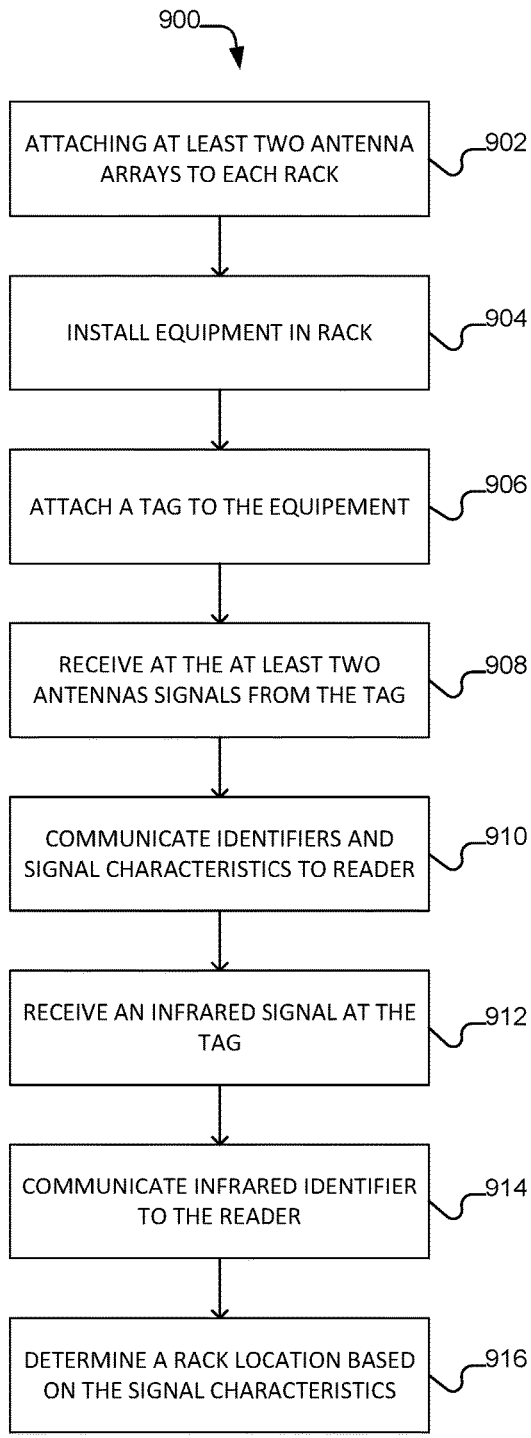

In an example illustrated in FIG. 9, a method 900 can include attaching at least two antenna arrays to a rack, as illustrated at 902. For example, the antenna arrays can be disposed opposite each other proximal to a face of the rack. For example, two antenna arrays can be disposed; one at the top edge and one at the bottom edge of the rack proximal to the front face of the rack. Alternatively, more than two antenna arrays can be disposed at corners or along orthogonal edges of a face of the rack. In particular, the antenna arrays are configured to receive a signal, such as an advertising or beacon signal, predominantly from within a plane of the face of the rack. One or more rack-based observer devices can be coupled to the antennas to process signals received from the antennas.

As illustrated at 904, equipment can be installed in the rack. For example, the rack can include a plurality of positions or slots at which equipment, such as servers and network devices, can be disposed. Tags can be attached to the equipment, as is illustrated at 906. In particular, the tags can be placed on front surface or extend out from a surface of the equipment proximal to a front face of the rack.

As illustrated at 908, the tags can transmit a signal, such as an advertising or beacon signal, to the at least two antenna arrays. The signals can include tag identifiers, and rack-based observers connected to the antennas can determine characteristics of the signal, such as signal strength. The signal can have a frequency in a range of between 2.0 GHz and 2.5 GHz, such as between 2.25 GHz and 2.5 GHz, or between 2.4 GHz and 2.485 GHz.

As illustrated at 910, the rack-based observers can communicate identifiers and the characteristics of the associated signals to a reader, for example using wireless signal. In a particular example, the reader communicates with tags in frequencies in a range of 400 MHz to 500 MHz, such as a range of 400 MHz to 450 MHz or ranges of 425 MHz to 440 MHz, in particular 433 MHz. In an alternative example, the signal can have a frequency in a range of between 2.0 GHz and 2.5 GHz, such as between 2.25 GHz and 2.5 GHz, or between 2.4 GHz and 2.485 GHz. Alternatively, the observer device can be coupled through a wired network to the reader or a central server.

As illustrated at 912, the tag can optionally receive an infrared signal that also includes an identifier, which can be used to further determine location. For example, the tag can communicate the identifier within the infrared signal to a reader or a rack-based observer device acting as the reader, as illustrated at 914. In an example, the identifier associated with the infrared signal can be incorporated into the beacon signal. In another example, the observer device through an antenna can establish a bi-directional network connection, such as a frequency hopping spread spectrum network connection.

The reader can communicate the data received from the observer device to the central server. For example, the reader can communicate identifiers and associated signal characteristics to the central server and optionally identifiers received from infrared beacons to the central server. As illustrated at 916, the central server can determine in which rack the equipment is located based on the identifiers and associated signal characteristics. For example, the system can utilize various algorithms, heuristics, or statistical methods to determine approximately in which rack the tag is located. For example, the system can determine maximum signal strength of signals with associated identifiers where the identifiers are associated with racks to determine in which rack the tags located. In another example, the system can utilize a linear combination of signal characteristics received from each rack and compare that linear combination to linear combinations of signal characteristics received from other racks to determine in which rack the device is located. For example, the signal strength at the top edge and bottom edge antenna arrays can be combined using a linear function, such as averaging, and compared to linear combinations of signal strengths received from other racks. In a further example, the signal strengths of the received signals can be indexed based on a minimum signal received from an array, a maximum signal received from an array, or a combination thereof. The indexed signal strengths can be used in an algorithm, heuristic, or statistical method to determine location. In another example, the central server can utilize statistics incorporating characteristics of the identified signals over time to determine in which rack the tag is most likely located.

Figure 10:
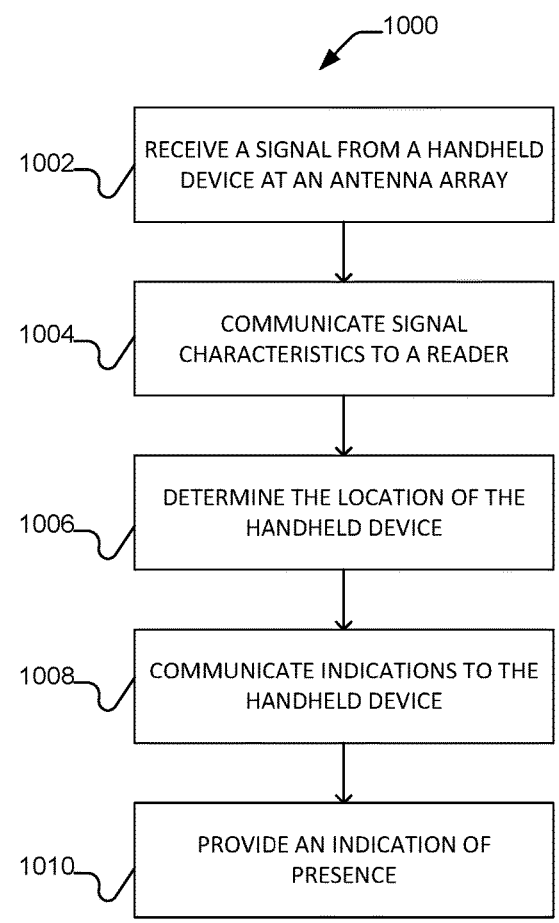

As illustrated in FIG. 10, when using a handheld device to locate a rack of equipment, a method 1000 can include transmitting from the handheld device beacon signals to the rack-based antenna arrays disposed proximal to faces of racks, as illustrated at 1002. In an example, the handheld can transmit the signal, and observer devices coupled to the antennas can determine signal characteristics similar to the functionality associated with the tag signals. The observer device can communicate to the reader the identifiers and signal characteristics associated with the signals received from the handheld device, as illustrated at 1004. In particular, the signal characteristic can include a signal strength. Alternatively, the handheld device can join a network established by an observer device or antenna array of a proximal rack and the associated rack-based observer device can communicate the signal data collected by the handheld device to the central server.

As illustrated at 1006, a central server can determine to which rack the handheld device is proximal. In particular, the central server can use algorithms, heuristics, or statistical methods similar to those used to determine the location of the tag. Alternatively, the handheld device can determine its location.

As illustrated at 1008, the central server can communicate to the handheld device through the reader instructions to indicate whether the handheld device is proximal to a desired rack. Such indications from the handheld device can include sounds, lights, messages on a display, vibration, or other user interface signals. In an alternative example, the central server can communicate with the handheld device through a reader or a network connection established with the rack-based observer device. Subsequently, the handheld device can implement the indication as instructed, as illustrated at 1010.

In an example, the observer device can transmit identifiers and associated signal characteristics to the central server when the signal is received. In another example, the observer device can transmit identifiers and associated signal characteristics when a change in the characteristics is observed, when a new tag or handheld device is detected, or when a duration passes without receiving a signal from a tag or handheld device. Such a change in characteristics can include changes that have a threshold difference. In another example, the observer device can aggregate information about signals and transmit the aggregated characteristics periodically. For example, the observer device can aggregate information and transfer the information periodically, such as at a period that is a multiple of a period associated with tag beacon transmissions. In an example, the aggregation period can be ½ to 5 times the tag beacon period, for example, ½ times or ½ times the beacon period.

In another example, observer devices can pass information to other observer devices and communicate aggregated information to the central server. For example, observer devices in racks within an area, such as along a row or an aisle can exchange information about the observed signals and one of the observer devices can communicate the information to the central server. In an example, the information can be communicated in a cascade to each observer device along a row or aisle, and the end observer device can communicate the observations to a central server. In another example, the information can be communicated to a select observer device that aggregates the information and communicates it to the central server. In a further example, the observer devices can each aggregate information from other observers and the observer coupled to the antenna or antennas observing the highest signal strength or, based on an algorithm or heuristic, being associated with the likely location of the tag or handheld device can communication the observed identities and characteristics to the central server.

In an alternative example illustrated in FIG. 11, a method 1100 can include attaching at least two antenna arrays to a rack, as illustrated at 1102. For example, the antenna arrays can be disposed opposite each other proximal to a face of the rack. For example, two antenna arrays can be disposed; one at the top edge and one at the bottom edge of the rack proximal to the front face of the rack. Alternatively, more than two antenna arrays can be disposed at corners or along orthogonal edges of a face of the rack. In particular, the antenna arrays are configured to provide a directed signal predominantly within a plane of the face of the rack.

As illustrated at 1104, equipment can be installed in the rack. For example, the rack can include a plurality of positions or slots at which equipment, such as servers and network devices, can be disposed. Tags can be attached to the equipment, as is illustrated at 1106. In particular, the tags can be placed on front surface or extend out from a surface of the equipment proximal to a front face of the rack.

As illustrated at 1108, the tags can receive a signal from the at least two antenna arrays. The signals can include identifiers and the tags can determine characteristics of the signal, such as signal strength. The signal can have a frequency in a range of between 2.0 GHz and 2.5 GHz, such as between 2.25 GHz and 2.5 GHz, or between 2.4 GHz and 2.485 GHz.

As illustrated at 1110, the tags can communicate identifiers and the characteristics of the associated signals to a reader, for example using wireless signal. In a particular example, the reader communicates with tags in frequencies in a range of 400 MHz to 500 MHz, such as a range of 400 MHz to 450 MHz or ranges of 425 MHz to 440 MHz, in particular 433 MHz. In an alternative example, the signal can have a frequency in a range of between 2.0 GHz and 2.5 GHz, such as between 2.25 GHz and 2.5 GHz, or between 2.4 GHz and 2.485 GHz.

Alternatively, a rack-based observer device can implement a master-slave network with tags through one of the at least two antenna arrays. For example, the observer device can implement a low-energy Bluetooth signal and act as a master to the tags to receive a communication from the tags of the identifiers and the characteristics of the signals. In such a case, the rack-based observer device can act as the reader.

As illustrated at 1112, the tag can optionally receive an infrared signal that also includes an identifier, which can be used to further determine location. For example, the tag can communicate the identifier within the infrared signal to a reader or a rack-based observer device acting as the reader, as illustrated at 1114.

The reader can communicate the data received from the tag to the central server. For example, the reader can communicate identifiers and associated signal characteristics to the central server and optionally identifiers received from infrared beacons to the central server. As illustrated at 1116, the central server can determine in which rack the equipment is located based on the identifiers and associated signal characteristics. For example, the system can utilize various algorithms, heuristics, or statistical methods to determine approximate in which rack the tag is located. For example, the system can determine maximum signal strength of signals with associated identifiers where the identifiers are associated with racks to determine in which rack the tags located. In another example, the system can utilize a linear combination of signal characteristics received from each rack and compare that linear combination to linear combinations of signal characteristics received from other racks to determine in which rack the device is located. For example, the signal strength of the top edge and bottom edge antenna arrays can be combined using a linear function, such as averaging, and compared to linear combinations of signal strengths received from other racks. In a further example, the signal strengths of the received signals can be indexed based on a minimum signal received from an array, a maximum signal received from an array, or a combination thereof. The indexed signal strengths can be used in an algorithm, heuristic, or statistical method to determine location. In another example, the central server can utilize statistics incorporating characteristics of the identified signals over time to determine in which rack the tag is most likely located.

Alternatively, the tag can determine its location based on the signals and signal characteristics. The tag can then communicate its location to the central server through the reader or the rack-based observer device acting as a reader.

As illustrated in FIG. 13, when using a handheld device to locate a rack of equipment, a method 1300 can include receiving at the handheld device signals from rack-based antenna arrays disposed proximal to faces of racks, as illustrated at 1302. In an example, the handheld can receive the signal and determine signal characteristics similar to the functionality of the tag. The handheld device can communicate to the reader the identifiers and signal characteristics associated with the signals received from the rack-based antenna arrays, as illustrated at 1304. In particular, the signal characteristic can include a signal strength. Alternatively, the handheld device can join a network established by an antenna array of a proximal rack and the associated rack-based observer device can communicate the signal data collected by the handheld device to the central server.

As illustrated at 1306, a central server can determine to which rack the handheld device is proximal. In particular, the central server can use algorithms, heuristics, or statistical methods similar to those used to determine the location of the tag. Alternatively, the handheld device can determine its location.

As illustrated at 1308, the central server can communicate to the handheld device through the reader instructions to indicate whether the handheld device is proximal to a desired rack. Such indications from the handheld device can include sounds, lights, messages on a display, vibration, or other user interface signals. In an alternative example, the central server can communicate with the handheld device through the rack-based observer device. Subsequently, the handheld device can implement the indication as instructed, as illustrated at 1310.

Figure 14:
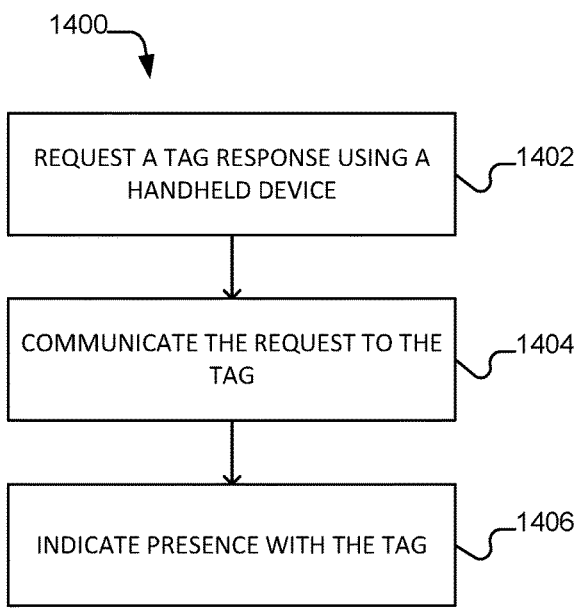

In another example illustrated in FIG. 14, a method 1400 includes requesting that a tag respond, as illustrated at 1402. For example, a handheld device can be used to request that the tag associated with an asset to be located provide an indication of its presence. Such a request can be transferred to a reader and communicated to the central server. Alternatively, the handheld can communicate with the central server through the rack-based observer device when the rack-based observer device can establish a network connection with the handheld device and communicate with the central server.

The central server can communicate with the tag through the reader or through the rack-based observer device acting as the reader, as illustrated at 1404. As a result, the tag can signal its presence, as illustrated at 1406. In an example, the tag can signal its presence using a light, sound, vibration, or combination thereof. In another example, the handheld device can act as the reader and send commands to the tag directly.

In a particular example, the above described beacon or advertising signals complies with the Bluetooth LE protocols of Bluetooth 4.0. In alternative examples, the beacon or advertising signals can comply with standards for advertising wireless networks, for example, under IEEE 802.11x.

In a first aspect, a system includes a central server; a reader in communication with the central server; a set of equipment racks, each equipment rack of the set of equipment racks defining a face and having a plurality of equipment slots distributed along the faces, the each equipment rack including an observer device and at least two antenna arrays, at least one of the at least two antennas in communication with the observer device, the at least two antennas extending along opposite edges and proximal to a face of the each equipment rack; and a set of tags attached to assets disposed within the set of equipment racks, each tag of the set of tags to transmit a beacon signal including a tag identifier of the each tag, the at least one antenna to receive the beacon signal, the observer device to communicate the tag identifier and the characteristics of the beacon signal to the reader, the reader to communicate the tag identifier and the characteristics of the beacon signal to the central server, the central server to determine a rack location based on the characteristics of the beacon signal.

In an example of the first aspect, the system further includes a handheld device to transmit a beacon signal.

In another example of the first aspect and the above examples, an antenna array of the at least two antenna arrays includes a set of patch antennas.

In a further example of the first aspect and the above examples, the patch antennas are shorted patch antennas.

In an additional example of the first aspect and the above examples, an antenna array of the at least two antenna arrays includes a set of inverted-F antennas. For example, the inverted-F antennas are tightly meandered inverted F antennas. In another example, inverted-F antennas are slot antennas.

In another example of the first aspect and the above examples, an antenna array of the at least two antenna arrays includes a set of antennas including interior antennas and edge antennas, wherein the edge antennas are out of phase with the interior antennas.

In a further example of the first aspect and the above examples, an antenna array of the at least two antenna arrays includes two antennas.

In an additional example of the first aspect and the above examples, an antenna array of the at least two antenna arrays includes four antennas.

In another example of the first aspect and the above examples, an antenna array of the at least two antenna arrays is disposed along a top edge of the face and an antenna array of the at least two antenna arrays is disposed along a bottom edge of the face.

In an additional example of the first aspect and the above examples, the each rack includes four antenna arrays. For example, a pair of antenna arrays of the four antenna arrays are disposed along a top edge of the face and a pair of antenna arrays of the four antenna arrays are disposed along a bottom edge of the face. In another example, each antenna array is disposed on a different edge of the face.

In another example of the first aspect and the above examples, each of the at least two antenna arrays is associated with different antenna identifiers, the observer device to transmit to the reader an antenna identifier with the tag identifier and the characteristic of the beacon signal.

In a further example of the first aspect and the above examples, the observer device communicates with the reader at frequencies having a range of 100 MHz to 1 GHz.

In an additional example of the first aspect and the above examples, the system further includes an infrared beacon to transmit an IR beacon identifier in an infrared signal, the tag to receive the infrared signal and communicate the IR beacon identifier to the observer device.

In another example of the first aspect and the above examples, the beacon signal has a frequency in a range of 2.0 GHz to 2.5 GHz.

In a further example of the first aspect and the above examples, the beacon signal has a power in a range of 0.01 W to 1.1 W.

In an additional example of the first aspect and the above examples, the beacon signal wherein the beacon signal is broadcast on three channels.

In another example of the first aspect and the above examples, the observer can establish a network using an antenna array of the at least two antenna arrays.

In a second aspect, a method for determining a rack location of an asset includes receiving at a set of rack-based antenna arrays a beacon signal from a tag, the beacon signal including a tag identifier, the set of rack-based antenna arrays disposed in a set of racks, each rack of the set of racks defining a face and having a plurality of equipment slots distributed along the face, the each rack including at least two antenna arrays of the set of rack-based antenna arrays disposed along edges of the rack and proximal to the face, at least one antenna array of the at least two antenna arrays in communication with an observer device; communicating the tag identifier and signal characteristic associated with the received beacon signal to a reader from each observer device associated with an antenna array of the set of rack-based antenna arrays, the reader communicating the tag identifier and signal characteristic to a central server; and determining a location of the tag based on the tag identifier and signal characteristic using the central server.

In an example of the second aspect, the method further includes receiving an infrared beacon signal at the tag, the infrared beacon signal including an infrared identifier and communicating the infrared identifier to the set of rack-based antenna arrays from the tag.

In another example of the second aspect and the above examples, the method further includes receiving a handheld beacon signal from a handheld device at the set of rack-based antenna arrays, the handheld beacon signal including a handheld identifier, and determining a handheld location of the handheld device based on the handheld identifier and the characteristics of the handheld beacon signal. For example, the method further includes communicating the handheld location to the handheld device, the handheld device indicating the handheld location.

In a further example of the second aspect and the above examples, the method further includes instructing the tag through the reader to indicate the tag's presence.

In an additional example of the second aspect and the above examples, the each observer device communicates with the reader at a frequency within a range of 100 MHz to 1 GHz.

In another example of the second aspect and the above examples, the each observer device communicates with the reader at a frequency within a range of 2.0 GHz to 2.5 GHz.

In a further example of the second aspect and the above examples, the beacon signal has a frequency in a range of 2.0 GHz to 2.5 GHz.

In an additional example of the second aspect and the above examples, the beacon signal has a power in a range of 0.01 W to 1.1 W.

In another example of the second aspect and the above examples, the beacon signal is broadcast on three channels.

In a third aspect, a system includes a central server; a reader in communication with the central server; a set of equipment racks, each equipment rack of the set of equipment racks defining a face and having a plurality of equipment slots distributed along the faces, the each equipment rack including an observer device and an antenna in communication with the observer device, the antenna extending along an edge and proximal to a face of the each equipment rack; and a set of tags attached to assets disposed within the set of equipment racks, each tag of the set of tags to transmit a beacon signal including a tag identifier of the each tag at a frequency in a range of 2.0 GHz to 2.5 GHz and a power in a range of 0.01 W to 1.1 W, the antenna to receive the beacon signal, the observer device to communicate the tag identifier and the characteristics of the beacon signal to the reader, the reader to communicate the tag identifier and the characteristics of the beacon signal to the central server, the central server to determine a rack location based on the characteristics of the beacon signal.

In an example of the third aspect, the system further includes a handheld device to transmit a beacon signal.

In another example of the third aspect and the above examples, an antenna array of the at least two antenna arrays includes a set of patch antennas. For example, the patch antennas are shorted patch antennas.

In a further example of the third aspect and the above examples, the antenna includes an inverted-F antenna. For example, the inverted-F antenna is a tightly meandered inverted F antenna. In another example, the inverted-F antenna is a slot antenna.

In an additional example of the third aspect and the above examples, the antenna is part of a set of antennas including interior antennas and edge antennas, wherein the edge antennas are out of phase with the interior antennas.

In another example of the third aspect and the above examples, the system further includes a second antenna.

In a further example of the third aspect and the above examples, the antenna is part of a set of antennas including four antennas.

In an additional example of the third aspect and the above examples, the antenna is disposed along a top edge of the face and a second antenna is disposed along a bottom edge of the face.

In another example of the third aspect and the above examples, the each rack includes four antenna arrays, wherein the antenna is part of an antenna array of the four antenna arrays. For example, a pair of antenna arrays of the four antenna arrays are disposed along a top edge of the face and a pair of antenna arrays of the four antenna arrays are disposed along a bottom edge of the face. In another example, each antenna array is disposed on a different edge of the face.

In a further example of the third aspect and the above examples, each antenna is associated with different antenna identifiers, the observer device to transmit to the reader an antenna identifier with the tag identifier and the characteristic of the beacon signal.

In an additional example of the third aspect and the above examples, the observer device communicates with the reader at frequencies having a range of 100 MHz to 1 GHz.

In another example of the third aspect and the above examples, the observer device communicates with the reader at frequencies having a range of 2.0 GHz to 2.5 GHz.

In a further example of the third aspect and the above examples, the system further includes an infrared beacon to transmit an IR beacon identifier in an infrared signal, the tag to receive the infrared signal and communicate the IR beacon identifier to the observer device.

In an additional example of the third aspect and the above examples, the beacon signal wherein the beacon signal is broadcast on three channels.

In another example of the third aspect and the above examples, the observer can establish a network using the antenna.

In a fourth aspect, a method for determining a rack location of an asset includes receiving at a set of rack-based antennas a beacon signal from a tag, the beacon signal having a frequency in a range of 2.0 GHz to 2.5 GHz and a power in a range of 0.01 W to 1.1 W and including a tag identifier, the set of rack-based antenna arrays disposed in a set of racks, each rack of the set of racks defining a face and having a plurality of equipment slots distributed along the face, the each rack including an antenna of the set of rack based antennas disposed along the edge of the rack and proximal to the face, the antenna in communication with an observer device; communicating tag identifiers and signal characteristics associated with the received beacon signal and an observer identifier to a reader from each observer device associated with an antenna of the set of rack-based antennas, the reader communicating the tag identifiers and signal characteristics and the observer identifiers to a central server; and determining a location of the tag based on the identifiers and signal characteristics using the central server.

In an example of the fourth aspect, the method further includes receiving an infrared beacon signal at the tag, the infrared beacon signal including an infrared identifier and communicating the infrared identifier to the set of rack-based antenna arrays from the tag.

In another example of the fourth aspect and the above examples, the method further includes receiving a handheld beacon signal from a handheld device at the set of rack-based antenna arrays, the handheld beacon signal including a handheld identifier, and determining a handheld location of the handheld device based on the handheld identifier and the characteristics of the handheld beacon signal. For example, the method further includes communicating the handheld location to the handheld device, the handheld device indicating the handheld location.

In a further example of the fourth aspect and the above examples, the method further includes instructing the tag through the reader to indicate the tag's presence.

In an additional example of the fourth aspect and the above examples, the each observer device communicates with the reader at a frequency within a range of 100 MHz to 1 GHz.

In another example of the fourth aspect and the above examples, the each observer device communicates with the reader at a frequency within a range of 2.0 GHz to 2.5 GHz.

In a further example of the fourth aspect and the above examples, the beacon signal is broadcast on three channels.

Embodiments of the above-described system provide technical advantages over conventional tracking systems. For example, tag locations can be identified with greater accuracy. The system exhibits less interference from adjacent racks or racks across the aisle, even in open door or no door rack systems.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system comprising:
    a central server;
    a reader in communication with the central server;
    a set of equipment racks, each equipment rack of the set of equipment racks defining a face and having a plurality of equipment slots distributed along the faces, the each equipment rack including an observer device and at least two antenna arrays, at least one of the at least two antennas in communication with the observer device, the at least two antennas extending along opposite edges and proximal to a face of the each equipment rack; and
    a set of tags attached to assets disposed within the set of equipment racks, each tag of the set of tags to establish a network with the observer device via the at least two antenna arrays, each tag of the set of tags to transmit a tag identifier of the each tag using a network signal associated with the network established with the observer device, the observer device to communicate the tag identifier and the characteristics of the network signal to the reader, the reader to communicate the tag identifier and the characteristics of the network signal to the central server, the central server to determine a rack location based on the characteristics of the network signal.

2. The system of claim 1, further comprising a handheld device to transmit a beacon signal.

3. The system of claim 1, wherein an antenna array of the at least two antenna arrays includes a set of patch antennas.

4. The system of claim 3, wherein the patch antennas are shorted patch antennas.

5. The system of claim 1, wherein an antenna array of the at least two antenna arrays includes a set of inverted-F antennas.

6. The system of claim 5, wherein the inverted-F antennas are tightly meandered inverted F antennas.

7. The system of claim 5, wherein the inverted-F antennas are slot antennas.

8. The system of claim 1, wherein an antenna array of the at least two antenna arrays includes a set of antennas including interior antennas and edge antennas, wherein the edge antennas are out of phase with the interior antennas.

9. The system of claim 1, wherein an antenna array of the at least two antenna arrays includes two antennas.

10. The system of claim 1, wherein an antenna array of the at least two antenna arrays includes four antennas.

11. The system of claim 1, wherein an antenna array of the at least two antenna arrays is disposed along a top edge of the face and an antenna array of the at least two antenna arrays is disposed along a bottom edge of the face.

12. The system of claim 1, wherein the each rack includes four antenna arrays.

13. The system of claim 12, wherein a pair of antenna arrays of the four antenna arrays are disposed along a top edge of the face and a pair of antenna arrays of the four antenna arrays are disposed along a bottom edge of the face.

14. The system of claim 12, wherein each antenna array is disposed on a different edge of the face.

15. The system of claim 1, wherein each of the at least two antenna arrays is associated with different antenna identifiers, the observer device to transmit to the reader an antenna identifier with the tag identifier and the characteristic of the beacon signal.

16. The system of claim 1, wherein the observer device communicates with the reader at frequencies having a range of 100 MHz to 1 GHz.

17. The system of claim 1, further comprising an infrared beacon to transmit an IR beacon identifier in an infrared signal, the tag to receive the infrared signal and communicate the IR beacon identifier to the observer device.

18. The system of claim 1, wherein the network signal has a frequency in a range of 2.0 GHz to 2.5 GHz.

19. The system of claim 1, wherein the network signal has a power in a range of 0.01 W to 1.1 W.

20. The system of claim 1, wherein the network signal is broadcast on three channels.

21. The system of claim 1, wherein the observer device provides a command to the each tag through the network.

* * * * *